United States Patent
Deng et al.

(10) Patent No.: US 9,395,920 B2
(45) Date of Patent: Jul. 19, 2016

(54) THROTTLE DISK I/O USING DISK DRIVE SIMULATION MODEL

(75) Inventors: Yimin Deng, Redmond, WA (US); Ho Yuen Chau, Redmond, WA (US); Yue Zuo, Redmond, WA (US); Forrest Curtis Foltz, Woodinville, WA (US)

(73) Assignee: MIROSOFT TECHNOLOGY LICENSING, LLC, Redmond, WA (US)

( * ) Notice: Subject to any disclaimer, the term of this patent is extended or adjusted under 35 U.S.C. 154(b) by 503 days.

(21) Appl. No.: 13/298,993

(22) Filed: Nov. 17, 2011

(65) Prior Publication Data
US 2013/0132057 A1    May 23, 2013

(51) Int. Cl.
*G06F 3/06* (2006.01)
*G06F 11/34* (2006.01)

(52) U.S. Cl.
CPC .......... *G06F 3/0613* (2013.01); *G06F 3/0659* (2013.01); *G06F 3/0676* (2013.01); *G06F 11/3433* (2013.01); *G06F 11/3485* (2013.01); *G06F 3/0664* (2013.01); *G06F 11/3419* (2013.01); *G06F 11/3447* (2013.01); *G06F 2201/815* (2013.01)

(58) Field of Classification Search
None
See application file for complete search history.

(56) References Cited

U.S. PATENT DOCUMENTS

| | | | | |
|---|---|---|---|---|
| 6,490,651 | B1 * | 12/2002 | Shats et al. | 711/112 |
| 7,565,484 | B2 * | 7/2009 | Ghosal et al. | 711/112 |
| 7,669,044 | B2 * | 2/2010 | Fitzgerald et al. | 713/1 |
| 7,711,894 | B1 | 5/2010 | Huang | |
| 7,761,875 | B2 | 7/2010 | Karamanolis | |
| 7,822,920 | B2 | 10/2010 | Park | |
| 2006/0171063 | A1 | 8/2006 | Chu et al. | |
| 2006/0187571 | A1 | 8/2006 | Kim et al. | |
| 2008/0021693 | A1 * | 1/2008 | Campbell et al. | 703/21 |
| 2008/0168452 | A1 * | 7/2008 | Molaro et al. | 718/103 |
| 2010/0011182 | A1 * | 1/2010 | Le Moal et al. | 711/167 |
| 2010/0070725 | A1 * | 3/2010 | Prahlad et al. | 711/162 |

(Continued)

FOREIGN PATENT DOCUMENTS

EP    2333663 A2    6/2011

OTHER PUBLICATIONS

D. Gupta et al, "DieCast: Testing Distributed Systems with an Accurate Scale Model", Proceedings of NSDI, pp. 407-421, Apr. 2008.*

(Continued)

*Primary Examiner* — Aniss Chad
*Assistant Examiner* — David M Rogers
(74) *Attorney, Agent, or Firm* — Ben Tabor; Kate Drakos; Micky Minhas

(57) ABSTRACT

Computerized methods, systems, and computer-storage media for throttling requests from virtual machines (VMs) to a hard-disk drive (HDD) are provided. When a request for disk I/O is received from a VM, a disk-drive model that simulates performance characteristics of the HDD is accessed. During access, the disk-drive model's estimation of HDD parameters and the disk-drive model's estimation of a current state of a disk head of the HDD are gathered. A projected execution time to carry out the request is computed as a function of the estimated HDD parameters and the estimated current state of the disk head. Also, an actual execution time to carry out the request is measured upon allowing the request to pass to the HDD. Using a comparison of the projected execution time and the actual execution time, the traffic of the requests from the VMs is throttled.

20 Claims, 5 Drawing Sheets

(56) References Cited

U.S. PATENT DOCUMENTS

2011/0145814 A1      6/2011  Mangione-Smith
2012/0278512 A1*    11/2012  Alatorre et al. ................. 710/33
2014/0250093 A1*     9/2014  Prahlad et al. ................ 707/696

OTHER PUBLICATIONS

Y. Gim et al, "DIG: Rapid Characterization of Modern Hard Disk Drive and It Performance Implication", Fifth IEEE International Workshop on Storage Network Architecture and Parallel I/Os, 2008, IEEE, pp. 74-83.*
H. Fujimoto et al, "Proposal of Seeking Control of Hard Disk Drives Based on Perfect Tracking Control Using Multirate Feedforward Control", Proceedings of the 6th International Workshop on Advanced Motion Control, 2000, IEEE, pp. 74-79.*
C. Ruemmler et al, "An Introduction to Disk Drive Modeling", IEEE Computer vol. 27 No. 3, Mar. 1994, pp. 17 29.*
K. Fukushima et al, "Vibration Suppression PTC of Hard Disk Drives with Multirate Feedback Control", Proceedings of the 2007 American Control Conference, Jul. 11 13, 2007, IEEE, pp. 55 60.*
S.W. Ng, "Advances in Disk Technology: Performance Issues", IEEE Computer, vol. 31 No. 5, 1998, pp. 75 81.*
T. Yamada et al, "A 16MB 3.5 Inch Ba Ferrite Flexible Disk Drive With Dual Track Following servo Modes", IEEE Transactions on Magnetics, vol. MAG 23, No. 5, Sep. 1987, pp. 2680 2682.*
M.Y. Javed et al, "Simulation and Performance Comparison of Four Disk Scheduling Algorithms", Proceedings of TENCON 2000, vol. 2, 2000, IEEE, pp. 10 15 vol. 2.*
M. Tsuchiya et al, "Distributed Database Management Model and Validation", IEEE Transactions on Software Engineering, vol. SE 12, No. 4, Apr. 1986, pp. 511 520.*
M.S.A. Talip et al, "Knowledge Based Disk Scheduling Policy Using Fuzzy Logic", International Conference on Computer and Communication Engineering (ICCCE 2010), IEEE, May 11 13, 2010, 6 pages.*
A. Al Mamun et al, "Design of Controller for the Dual Stage Actuator in Hard Disk Drive Using Internal Model Approach", Proceedings of the 4th World Congress on Intelligent Control and Automation, Jun. 10 14, 2002, IEEE, pp. 2561 2565.*
A. Al Mamun et al, "Iterative Feedback Tuning (IFT) of Hard Disk Drive Head Positioning Servomechanism", The 33rd Annual Conference of the IEEE Industrial Electronics Society (IECON), Nov. 5 8, 2007, pp. 769 774.*
IO Performance Prediction in Consolidated Virtualized Environments; Stephan Kraft, et al; pp. 295-306; http://www.doc.ic.ac.uk/~gcasale/icpe11io.pdf; 12 pages.
DieCast: Testing Distributed Systems with an Accurate Scale Model—Published Date: Apr. 2008; D. Gupta, et al.; http://research.microsoft.com/pubs/78554/nsdi08-diecast.pdf; 15 pages.
Smart Data Center: Disk IO Throttling for Optimal Performance; http://joyeurcom/2011/06/22/smartdatacenter-disk-io-throttling-for-optimal-performance; 2 pages.
Rate Windows for Efficient Network and I/O Throttling; Kyung D. Rye, et al.; http://citeseerx.ist.psu.edu/viewdoc/download?doi=10.1.1.24.7403&rep=rep1&type=pdf; 14 pages.
Our ZFS I/O Throttle; Bill Pijewski's Blog; http://dtrace.org/blogs/wdp/2011/03/our-zfs-io-throttle; posted Mar. 1, 2011; 7 pages.
Empirical Virtual Machine Models for Performance Guarantees; Andrew Turner, et al.; http://www.usenix.org/event/lisa10/tech/full_papers/Turner.pdf; 11 pages.
PCT International Search Report mailed Feb. 28, 2013 regarding Appln. No. PCT/US2012/064587 9 pages.
"First Office Action with Search Report Issued in Chinese Patent Application No. 201210465126.7", Mailed Date: Mar. 3, 2015, 11 Pages.
"European Search Report Received for European Patent Application 12850595.5", Mailed Date: May 27, 2015, 4 Pages.
Ahmad, et al., "An Analysis of Disk Performance in VMware ESX Server Virtual Machines", In IEEE International Workshop on Workload Characterization, Jan. 1, 2003, pp. 65-76.

* cited by examiner

THROTTLE DISK I/O USING DISK DRIVE SIMULATION MODEL

BACKGROUND

Large-scale networked systems are commonplace platforms employed in a variety of settings for running applications and maintaining data for business and operational functions. For instance, a data center (e.g., physical cloud computing infrastructure) may provide a variety of services (e.g., web applications, email services, search engine services, etc.) for a plurality of customers simultaneously. These large-scale networked systems typically include a large number of resources distributed throughout the data center, in which each resource resembles a physical machine or a virtual machine (VM) running on a physical node or host. When the data center hosts multiple tenants (e.g., customer programs), these resources are optimally allocated from the same data center to the different tenants.

Often, multiple VMs will concurrently run on the same physical node within a computing network, or the data center. These VMs that share a common physical node may be allocated to the different tenants and may require different amounts of resources at various times. For instance, the resources may include a physical disk (e.g., hard-disk driver) associated with a physical node, where the physical disk has a limited amount of accessibility over a certain time frame. When one tenant requires an increased usage of physical disk to accomplish a particular task, the tenant's VMs running on the physical node can potentially stress the physical disk by sending a large amount of requests thereto, preventing other VMs running on the physical node from fairly sharing the resources thereof.

Presently, because disk input/output (I/O) performance (e.g., time to access a segment of data) typically lags behind CPU-performance (e.g., processor speed) and network performance (e.g., bandwidth usage) of the VMs running on the physical node, there exists basic approaches for metering the requests sent from the VMs to the physical disk. These approaches meter requests by attempting to describe disk I/O performance using either the rate of storage (MB/sec) or, in the alternative, the rate of activity (requests/sec). In the instance of using MB/sec, this approach considers a size of data being read or written, but not how the data is arranged within the physical disk. On the other hand, in the instance of using requests/sec, this approach considers a number of times a disk head is asked to move over the physical disk within a given time frame. That is, using the requests/sec approach does not consider the size of data that is being accessed upon movement of the disk head.

Accordingly, because the MB/sec-based approach (relevant to sequential access only) and the request/sec-based approach (relevant to random access only) are each focused on a different specific aspect of disk I/O performance, these existing approaches fail to account for both sequential access and random access on the physical disk. For example, the MB/sec-based approach is focused on sequential accesses, thus, assuming the risk of being overwhelmed by a flood of random accesses and generating a backlog of requests. On the other hand, the request/sec-based approach is focused on random accesses, thus, assuming the risk of encountering a string of sequential accesses and unnecessarily limiting the amount of throughput to the physical disk. Consequently, failing to account for sequential access and random access, or to recognize the dramatic differences in resultant disk I/O performance between them, renders these approaches ineffective.

SUMMARY

This Summary is provided to introduce concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention provide a mechanism that throttles requests issued from service application(s) running on virtual machines (VMs), which reside on a common physical machine or node of a data center, in accordance with a disk-drive model. As used herein, the phrase "disk-drive model" generally refers to a soft-disk representation of a hard-disk drive (HDD), where the disk-drive model simulates performance characteristics of the HDD when computing projected execution times for carrying out the service-application requests. In an exemplary embodiment, the disk-drive model simulates performance characteristics of the HDD by considering at least the following two factors of the HDD: a set of parameters that correspond to a set of actual parameters presently existing on the HDD; and a current state of the disk head of the HDD. As discussed more fully below, the current state of the disk head can be used to calculate a time consumed by moving the disk head from a first position that satisfies a presently executing request to a second position that satisfies a pending request.

Previous approaches for quantifying performance of an HDD are limited to considering either MB/sec (amount of information transferred or request/sec (rate of operation). The approach employed in embodiments of the present invention relies on the disk-drive model that accurately quantifies disk I/O performance based on various factors, including the two factors mentioned above. Further, the approach in embodiments of the present invention applies the disk-drive model to determine how the disk I/O requests to read or write (hereinafter "requests") should be handled, such as limiting, or "throttling," the requests based on the fact of how the HDD is performing relative to the disk-drive model. Properly throttling disk I/O is advantageous in a cloud-computing environment for various reasons, such as providing a way to decouple VM Disk performance from underlying physical storage hardware (e.g., HDD) and providing the ability to assign a performance threshold dynamically to individual VMs. As more fully discussed below, the performance threshold is calculated upon comparing a projected execution time of a request (using the disk-drive model) and an actual execution time of the request (measuring the time taken by the HDD to carry out the request).

In an exemplary embodiment, the disk-drive model is used for the purpose of throttling the requests for disk I/O. Initially, for each disk I/O operation being request, a projected execution time (i.e., time spent by the disk-drive model to handle the disk I/O operation) is computed. In operation, the projected execution time spent by the disk-drive model may be used as a baseline bar for the throttling decision.

Once passed to the HDD, an actual execution time (i.e., time spent by the HDD to carry out the disk I/O operation) is measured. If the actual execution time of the HDD is less than the projected execution time of the disk-drive model, the HDD is outperformed. When the HDD outperforms the disk-drive model to a certain extent, the subsequent disk I/O operations may be executed in a delayed manner, or, in other words, the subsequent requests may be throttled. By way of example, throttling may involve adding time when scheduling the subsequent requests when the HDD is outperformed. Or, throttling may involve processing the subsequent requests immediately when the HDD is underperformed. As such, using the disk-drive model to determine when to selectively place restrictions on consumption of requests may ameliorate stressing the capacity of the HDD or adversely affecting the quality of service that is guaranteed to tenants of the data center in which the VMs reside while, at the same time, maximizing throughput of disk I/O operations. Further, in practice, throttling may be used when the HDD is not over stressed. In one example, if different performance levels are assigned to different types of VMs, throttling may help enforce these performance levels are upheld. In another example, if a particular customer's VM is guaranteed a performance level regardless of where it is deployed (e.g., on a fast physical machine or on a slower machine), throttling may help ensure that guaranteed performance level is upheld.

BRIEF DESCRIPTION OF THE DRAWINGS

Embodiments of the present invention are described in detail below with reference to the attached drawing figures, wherein.

DETAILED DESCRIPTION

Figure 1:
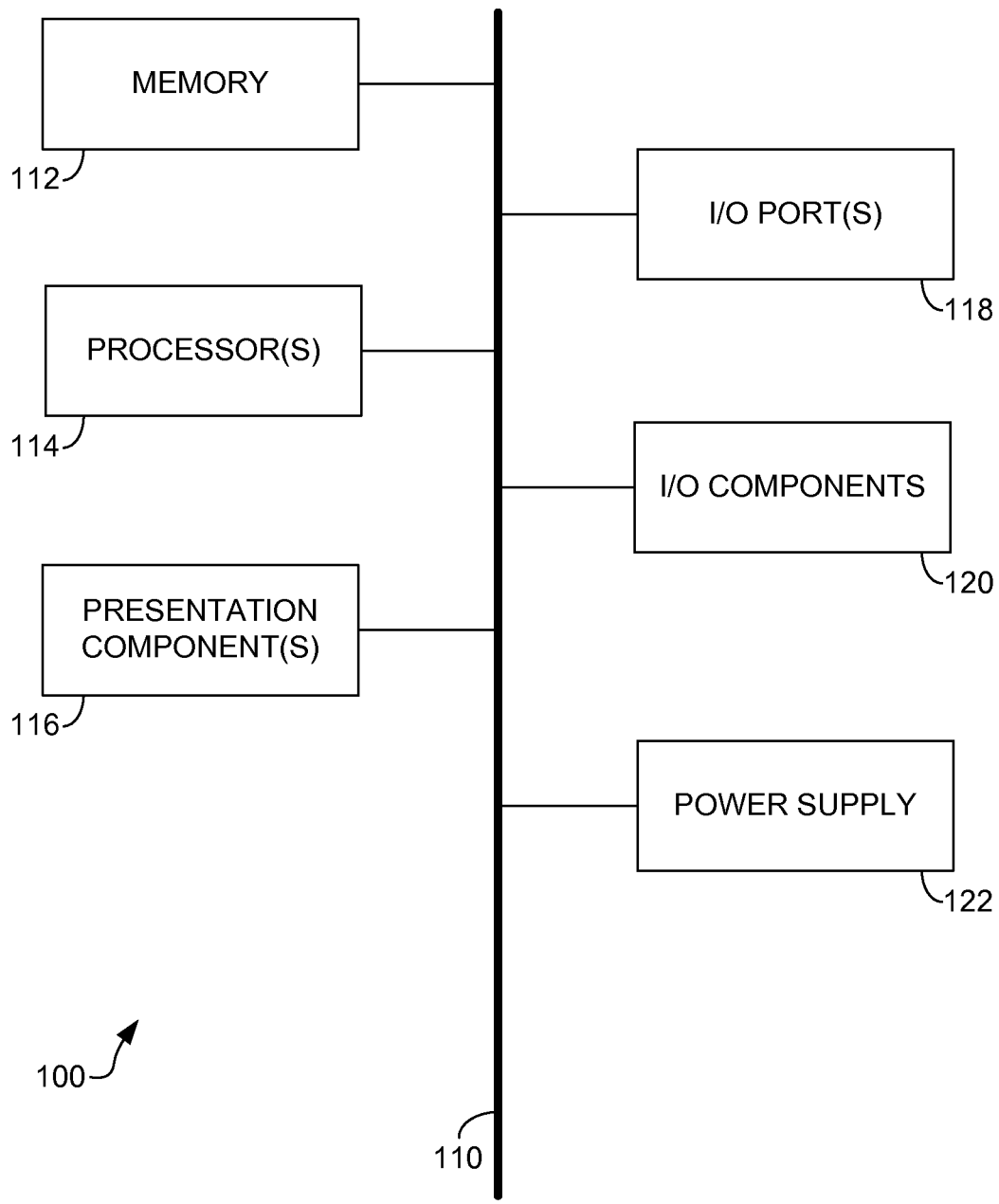
FIG. 1 is a block diagram of an exemplary computing environment suitable for use in implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Embodiments of the present invention relate to methods, computer systems, and computer-readable media for applying a throttle to a source (e.g., virtual machines (VMs) instantiated on a physical node) of requests for disk I/O operations to be handled by a hard-disk drive (HDD). The applied throttle may, in operation, meter the requests from the VMs according a comparison between a projected execution time of a request (using the disk-drive model) and an actual execution time of the request (measuring the time taken by the HDD to carry out the request). In an exemplary embodiment, metering involves delaying delivery of those requests that are issues after identifying the projected execution time exceeds the actual execution time. By way of example, metering may be implemented by a filter driver that causes the host to store, or "enqueue," the delayed requests issued by the VMs.

In one aspect, embodiments of the present invention relate to one or more computer-readable media having computer-executable instructions embodied thereon that, when executed, perform a method for throttling requests from one or more VMs to the HDD using the filter driver. Initially, the method may commence upon the filter driver receiving a subject request from a service application running on one or more of the VMs. Upon parsing the request, the disk-drive model is accessed. In an exemplary embodiment, the disk-drive model behaves substantially similar to the HDD. In a particular instance, the process of accessing includes reading the disk-drive model's simulation of performance characteristics of the hard-disk drive and reading the disk-drive model's simulation of a current state of a disk head of the hard-disk drive.

The method carried out by the filter driver may further include the step of computing a projected execution time to carry out the subject request as a function of the performance characteristics and the current state of the disk head. Also, the actual execution time to carry out the subject request may be measured upon the filter driver allowing the subject request to pass to the HDD. Using a comparison of the projected execution time and the actual execution time, the traffic of the requests from the VMs, which are issued after the subject request to the HDD, are throttled.

In another aspect, embodiments of the present invention relate to a computer system capable of throttling a rate at which requests from a service application are executed by the HDD, where throttling is managed in accordance with the disk-drive model. The computer system includes at least one physical machine (e.g., node of a data center) configured with a computer-storage medium that has a plurality of computer software components running thereon. Initially, the computer software components include a VM, a VM bus, and a file system driver running in the host partition. In operation, the VM is configured for hosting a portion of the service application (e.g., an instance of a service-application role or component program). This portion of the service application is capable of issuing requests to read data from or write data to a virtual hard-disk (VHD) file associated with the VM. Typically, a copy of the VHD file is maintained on a hard disk of the HDD.

In further embodiments of the computer system, the filter driver is configured for comparing a projected execution time of a first request against an actual execution time of the first request. In general, the "projected execution time" is calculated using the disk-drive model that simulates performance characteristics of the hard-disk drive, while the "actual execution time" is measured upon completion of a request at the hard-disk drive. The filter driver is further configured for affecting a timing for carrying out the subsequent request based on an outcome of the comparison. The VM bus is configured to deliver the request from the service application to the filter driver and the queue(s) are configured to hold requests issued from the VM that were delayed by the filter driver, Typically, the requests in these queues will be processed and sent to the HDD at a later time.

In yet another aspect, embodiments of the present invention relate to a computerized method for limiting a rate of requests flowing to a hard-disk drive. In embodiments, the method involves employing the disk-drive model to compute the projected execution time for the HDD to carry out a first request and measuring the actual execution time taken by the HDD to carry out the first request. When calculating the projected execution time, the disk-drive model considers a time for a disk head (used to read data from or write data to a hard disk of the HDD) to travel from the last sector of data targeted by the first request and to the first sector of data targeted by a second request.

At some point, the projected execution time is compared against the actual execution time and the rate of the requests allowed to pass to the HDD is managed as a function of an outcome of the comparison. In one instance, the process of managing includes imposing a delay upon the request before passing the request to the HDD when the projected execution time exceeds the actual execution time by a value greater than a performance threshold. In another instance, the process of managing includes passing the request to the HDD upon receipt of the request when projected execution time does not exceed the actual execution time by a value greater than the performance threshold.

Having briefly described an overview of embodiments of the present invention, an exemplary operating environment suitable for implementing embodiments of the present invention is described below. In particular, an exemplary operating environment supports functionality of a mechanism (e.g., filter driver 230 of FIG. 2) that allows VMs residing on a common physical node to each send requests for disk I/O by placing restrictions on resource consumption at the HDD; thus, ameliorating a stressed condition of overloading the HDD with pending requests or adversely affecting throughput to the HDD unnecessarily.

Operating Environment

Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and nonremovable media. By way of example, and not limitation, computer-readable media may comprise computer storage media and communication media. Computer storage media include both volatile and nonvolatile, removable and nonremovable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which can be used to store the desired information and which can be accessed by computing device 100. Communication media typically embody computer-readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

System for Implementation

Figure 2:
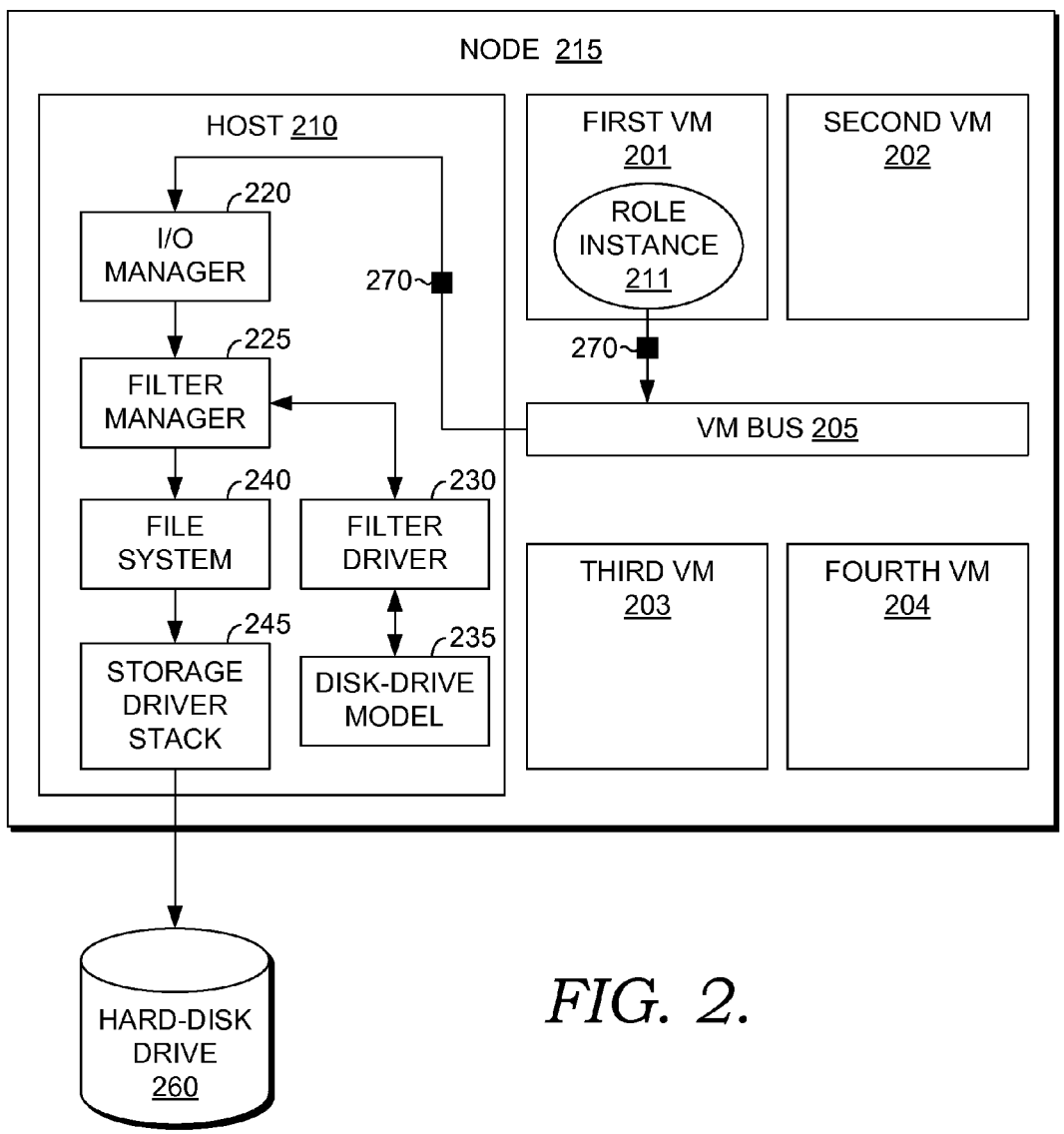
FIG. 2 is a block diagram illustrating an exemplary cloud-computing platform, suitable for use in implementing embodiments of the present invention, that is configured to employ a disk-drive model for computing a projected execution time of an incoming request.

With reference to FIGS. 1 and 2, a physical node 215 may be implemented by the exemplary computing device 100 of FIG. 1. One or more of the virtual machines (VMs) 201, 202, 203, and 204 may include portions of the memory 112 of FIG. 1 and/or portions of the processors 114 of FIG. 1. In embodiments, the VMs 201-204 may each represent a respective guest partition of the node 215, where the guest partition is enabled to host a service application, or, at least, a portion thereof. Generally, the service application is owned by a tenant (e.g., customer) of a cloud-computing platform that hosts the service application in a distributed manner. The node 215 may further support a host 210 with various component 220, 225, 230, 235, 240, and 245 running thereon. In embodiments, the host 210 represents a root partition of the node 215 where the root partition is tasked with generally managing requests from the guest partitions, such as requests to implement disk I/O operations at the hard-disk drive (HDD) 260.

Turning now to FIG. 2, a block diagram is illustrated, in accordance with an embodiment of the present invention, showing an exemplary cloud-computing platform 200 that is configured to employ a disk-drive model 235 for computing a projected execution time of an incoming request 270. As illustrated, the request 270 is issued from a role instance 211 of a service application that is assigned to the first VM 201. A VM bus 205 is employed to convey the request 270 from the first VM 201 to the host 210. In embodiments, the VM bus 205 is used to transport traffic of requests from the VMs 201-204 on the node 215 to the host 210 for throttling prior to processing at the HDD 260.

Although only one service-application portion (role instance 211) is illustrated in FIG. 2, it should be understood that various other component programs of other service applications may be assigned to and placed upon the VMs 201-204, as discussed more fully below. That is, the VMs 201-204 within the node 215 may be occupied by various service applications. By way of example, a portion of service application A may occupy VM 202 while portions of service application B may occupy VMs 203 and 204, where each of the VMs 202-204 that are instantiated on the physical node 215 to support functionality of the service applications A and B.

It should be understood and appreciated that the cloud-computing platform 200 shown in FIG. 2 is merely an example of one suitable computing system environment and is not intended to suggest any limitation as to the scope of use or functionality of embodiments of the present invention. For instance, the cloud-computing platform 200 may be a public cloud, a private cloud, or a dedicated cloud. Neither should the cloud-computing platform 200 be interpreted as having any dependency or requirement related to any single component or combination of components illustrated therein. Further, although the various blocks of FIG. 2 are shown with lines for the sake of clarity, in reality, delineating various components is not so clear, and metaphorically, the lines would more accurately be grey and fuzzy. In addition, any number of physical machines, virtual machines, data centers, endpoints, or combinations thereof may be employed to achieve the desired functionality within the scope of embodiments of the present invention.

The cloud-computing platform 200 typically includes data centers configured to host and support operation of the VMs 201-204 that host portions (e.g., role instance 211 or other endpoints) of distributed service applications owned by tenants/customers of the cloud-computing platform 200. The phrase "service application," as used herein, broadly refers to any software, or portions of software, that runs on top of, or accesses storage locations within, the cloud-computing platform 200. In one embodiment, the role instance 211 may represent a portion of software or a component program that participates in supporting functionality of the service application. It will be understood and appreciated that role instance 211 shown in FIG. 2 is merely an example of a suitable part to support a service application and is not intended to suggest any limitation as to the scope of use or functionality of embodiments of the present invention.

Generally, VMs 201-204 are instantiated and designated to one or more service applications, respectively, based on demands (e.g., amount of processing load) placed on the service application. As used herein, the phrase "virtual machine" is not meant to be limiting, and may refer to any software, application, operating system, or program that is executed by a processing unit to underlie the functionality of the service application.

Further, the VMs 201-204 may request processing capacity, access to storage locations, resources, and other assets (e.g., hosting agent) within the node 215 to properly support the service applications. In response, the VMs 201-204 may be dynamically allocated resources (e.g., network bandwidth, CPU processing-capacity, or disk I/O at the HDD) to satisfy a current workload. As indicated above, the host 210 may assist with allocating resources to the VMs 201-204. Specifically, the filter driver 230 of the host 210 may manage throttling of requests issued from the VMs 201-204 that are directed to the HDD 260 for processing.

As discussed above, the VMs 201-204 may be dynamically allocated resources within the node 215. Per embodiments of the present invention, the node 215 may represent any form of computing device, such as, for example, a personal computer, a desktop computer, a laptop computer, a mobile device, a consumer electronic device, server(s), the computing device 100 of FIG. 1, and the like. In one instance, the node 215 supports the operations of the VMs 201-204, respectively, while simultaneously hosting other virtual machines (not shown) carved out for supporting other tenants of cloud-computing platform 200, where the tenants include endpoints of other service applications owned by different customers.

Typically, the node 215 includes, or is linked to, some form of a computing unit (e.g., central processing unit, microprocessor, etc.) to support operations of the VMs 201-204, and/or components 220, 225, 230, 235, 240, and 245 running thereon. As utilized herein, the phrase "computing unit" generally refers to a dedicated computing device with processing power and storage memory, which supports one or more operating systems or other underlying software. In one instance, the computing unit is configured with tangible hardware elements, or machines, that are integral, or operably coupled, to the node 215 to enable each endpoint to perform a variety of processes and operations. In another instance, the computing unit may encompass a processor (not shown) coupled to the computer-readable medium accommodated by the node 215. Generally, the computer-readable medium stores, at least temporarily, a plurality of computer software components (e.g., components 220, 225, 230, 235, 240, and 245) that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions.

In one aspect, the VMs 201-204 operate within the context of the cloud-computing platform 200 and, accordingly, may communicate internally within the node 215, communicate across physical nodes through connections dynamically made that traverse a data center, and externally through a physical network topology to resources of a remote network (e.g., enterprise private network). The connections may involve interconnecting VMs distributed across physical resources of the data center via a network cloud (not shown). The network cloud interconnects these resources such that one VM may recognize a location of another VM in order to establish a communication therebetween. For instance, the network cloud may establish this communication over channels connecting VMs hosting component programs of a common service application. By way of example, the channels may include, without limitation, one or more local area networks (LANs) and/or wide area networks (WANs). Such networking environments are commonplace in offices, enterprise-wide computer networks, intranets, and the Internet. Accordingly, the network is not further described herein.

The general functionality of the components 220, 225, 230, 235, 240, and 245 running on the host 210 will now be described with respect to the request 270 issued from the role instance 211. In embodiments, the I/O manager 220 initially receives the request 270 and parses the request to gain an understanding of the instructions therein. In an exemplary embodiment, the instructions of the request 270 may include a command to carry out a read operation or a write operation that consumes disk I/O at the HDD 260. The I/O manager 220 then passes the request 270 to the filter manager 225 for determining whether to handle the request 270 immediately or to impose a delay on the request 270. The filter manager 225 may have a plurality of types of filters at its disposal to assist in properly managing the traffic of requests from the VMs 201-204. In one instance, the filter manager may consult the filter driver 230 to throttle the traffic of requests from the VMs 201-204, in accordance with a disk-drive model 235 and a current status of the HDD 260. Embodiments of throttling will be discussed more fully below with respect to FIG. 3. Once the filter manager 225 deems the request 270 is allowable to be processed, the file system 240 interprets the request 270, determines the appropriate virtual hard disk (VHD) file to access, and identifies a location of the VHD file. Next, the storage driver stack 245 implements the request 270 by controlling the HDD 260 to read from or write to the VHD file on a hard disk of the HDD 260.

In embodiments, the VHD file generally represents a virtual hard-disk file with a particular formatting applied thereto. This file formatting can maintain proper storage of data on the HDD 260, such as disk partitions and a file system. These disk partitions may include structured data, such as files and folders. In operation, the VHD file may be used as the hard-disk memory of a virtual machine.

A general configuration of the HDD 260 will now be discussed. Initially, the HDD 260 represents a nonvolatile, random-access digital magnetic storage device. Included within the HDD 260, is a rotating rigid platter (e.g., a hard disk) that is rotated by a motor-driven spindle within a protective enclosure. Data is magnetically read from and written to the hard disk by at least one disk head. In one embodiment, the HDD 260 employs a mechanism that moves the disk head to a correct location and reads a number of bytes from the hard disk. Moving the head to the correct location consumes a certain amount of time that is considered by the filter driver 230 when assigning tasks to HDD 260.

Often, the request 270 will ask the HDD 260 to target a particular portion of data on the hard disk as part of a read operation or a write operation. The targeted data may be located within a first sector of the hard disk while another portion of data targeted by a subsequent request may be located within the second sector of the hard disk. Further, the first sector and the second sector may be located on different tracks (e.g., concentric circles of magnetically stored information) recorded on the hard disk. Accordingly, upon completing the request 270 and commencing carrying out the subsequent request, a certain amount of time is consumed when the disk head travels a lateral distance from the first sector to the second sector of the hard disk. It should be understood and appreciated, in embodiments, the sectors holding data on the magnetic surface of the hard disk represent micrometer-sized subdivisions or magnetic domains that are assigned to a particular file or folder (e.g., VHD file).

When switching from carrying out the request 270 to carrying out the subsequent request, the HDD 260 undertakes several processes that consume time and, thus, affect scheduling of the requests from the VMs 201-204. These time-consuming processes of the HDD 260 include controller latency, seek speed, rotational latency, and data-transfer rate. The controller latency refers to the overhead that the disk controller (e.g., I/O manager 220) imposes in interpreting and executing the request 270. The seek speed, as mentioned immediately above, refers to the time consumed to move the disk head from a track on the hard disk holding the first sector of data (targeted by a pending request) to another track on the disk head holding the second sector of data (targeted by a subsequent request). The rotational latency refers to the time consumed to rotate the hard disk to a beginning of the second sector of data once the disk head is moved to the appropriate track. The data-transfer rate refers to the speed at which the hard disk is rotated and at which the data is read from or written to the hard disk (e.g., number of blocks of contiguous files transferred to or from the hard disk).

In an exemplary embodiment, these time-consuming processes (e.g., controller latency, seek speed, rotational latency, and data-transfer rate) are quantified as a set of actual parameters affecting disk I/O performance of the HDD 260. That is, this set of actual parameters exposes performance characteristics of the HDD 260 that can be employed to influence the throttling of requests directed to the HDD 260. For instance, a set of estimated parameters (substantially corresponding to the set of actual parameters of the HDD 260) that attempt to specify the performance characteristics of the HDD 260 may be incorporated within the disk-drive model 235.

As used herein, the phrase "disk-drive model" is not meant to be limiting but may encompass any logic, heuristics, or software-based rules that assist the filter driver 230 in managing the flow of the traffic directed toward the HDD 260. In one embodiment, the disk-drive model 235 is built by the filter driver 230 to substantially mimic behavior of the HDD 260 by programming the set of estimated parameters (discussed above) within the disk-drive model 235. Further, the disk-drive model 235 may be programmed to consider a current state of the HDD 260, which specifies the present disk-head position and total time consumed in satisfying the pending request 270. The current state of the HDD 260 may be used to determine the time required for the disk head to travel to the next location on the hard disk targeted by the subsequent request (e.g., time consumed to cover a distance of travel when updating the position of the disk head). Thus, for the pending request 270, the time consumed is estimated based on the type of access (read or write), the location of the data, and amount of processing required to complete the request 270. Consequently, the projected execution time determined using the disk-drive model 235, used by the filter driver 230 to govern the throttling of requests, considers both the set of actual parameters (capturing present performance characteristics of the HDD 260) as well as the time consumed to transition from one request to another (using the calculation of the distance between a current disk-head position and a next disk-head position).

By way of background, sequential access involves reading the sectors of the hard disk consecutively within a particular track. That is, sequential access comprises reading one adjacent sector after another physically proximate sector on the hard disk without translating the disk head. Typically, there is a minimal amount of time consumed by moving the disk head to the next physically proximate sector on the hard disk. Random access involves reading data in different sectors that are in various locations (e.g., different tracks on the hard disk)

in relation to each other. Typically, there is a significant amount of time consumed when the disk head travels from one sector to another. As mentioned above, the disk-drive model's 235 consideration of the set of parameters estimated from the HDD 260 and the current/future state of the disk-head position accounts for time consumption involved in both sequential access and random access, respectively.

Operation of the Filter Driver

Figure 3:
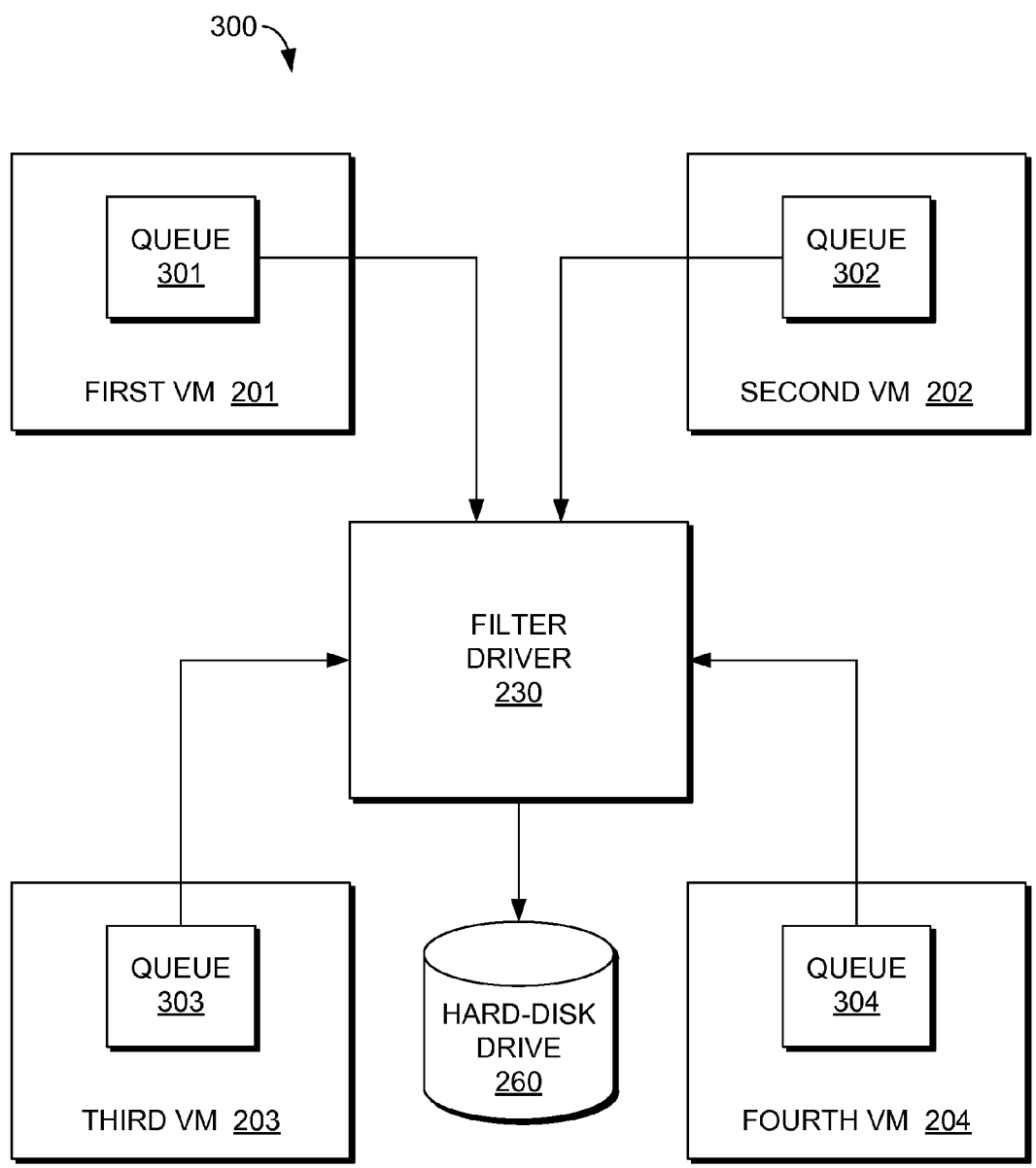
FIG. 3 is block diagram of an exemplary distributed computing environment depicting queues within a physical node communicating to a filter driver, in accordance with an embodiment of the present invention.

Turning to FIG. 3, a block diagram is illustrated showing an exemplary distributed computing environment 300 depicting queues 301-304 within one or more physical node(s) communicating with the filter driver 230, in accordance with an embodiment of the present invention. In embodiments, the VMs 201-204 manage the queues 301-304, respectively, although each of the VMs 201-204 may have multiple queues for temporarily holding pending requests. Once released from the queues 301-304, the requests are serviced by the file system in coordination with the HDD 260. It should be noted that each of the queues 301-304 may be managed separately, where each is assigned a percentage of the software disk.

Initially, service applications running within the VMs 201-204 may issue requests to perform a read and/or write operation on the HDD 260. In one instance, these read and/or write operations may be directed to a host over a VM bus and may be targeted to respective VHD files of interest that reside on the HDD 260. Upon reaching the host, the filter driver 230 intercepts each read and write operation and processes them before being passed to the file system. In general, the filter driver 230 is responsible for the management of throttling disk I/O requests.

During processing, the filter driver 230 computes the time required for the disk-drive model to process the read or write operation that satisfies the request from the service application. This computation considers at least the following two inputs: a current state of the disk-drive model; and attributes of the currently executed read or write operation (e.g., data size and its location). For example, the time expended to process the read or write operation by the disk-drive model may be computed as the sum of the latencies listed below: controller latency (e.g., time estimated for the disk controller to parse the request); seek time (e.g., time estimated for the disk head to move from a current position on a first HDD track to a projected position on a second HDD track, where data to be accessed is located); rotational latency (e.g., time estimated for the requested sector to rotate into a position under the disk head; and data transfer time (e.g., time estimated to read or write the data of a given size). Thus, by considering these various inputs, the computation of a projected execution time (using the disk-drive model) accounts for both sequential access and random access. For example, incorporating the seek time within the projected execution time helps to account for a delay incurred during random access of data, where the seek time may be insignificant in value when the request may be carried out via sequential access of data.

Upon determining the projected execution time, the actual execution time spent by the storage driver stack and physical disk hardware (e.g., HDD 260) to handle the read and write operation directed to the VHD file is measured. In one instance, the filter driver 230 may record the actual time consumed by the physical disk hardware to process a subject request.

Upon computing the projected execution time and measuring the actual execution time, the filter driver 230 may implement an analysis that determines the difference in time between the two metrics above (projected execution time and actual execution time). This difference in time indicates whether the physical disk hardware is outperforming or underperforming the disk-drive model. If the physical disk hardware outperforms the disk-drive model then the request may be delayed by holding it in a queue associated with the VHD file of the requesting VM requesting VM. Typically, there is a separate queue to hold the delayed requests for each VHD. A VM may be assigned more than one VHD, thus, the VM may be associated with more than one queue.

In a specific example, if the difference between the actual execution time and the projected execution time is greater than a predefined performance threshold associated with the requesting VM, the subsequent HDD 260 operations will be executed in a delayed manner, or, in other words, throttled. With reference to FIG. 3, for instance, if the requests from queue 301 are processed faster than the disk-drive model, then the filter driver 230 may elect to delay servicing requests issued from VM 201. In another embodiment, if the physical disk hardware outperforms the disk-drive model, the amount of delay of the request may be based on the difference of the comparison (e.g., if the physical disk hardware performs much faster, then a longer delay is imposed). Accordingly, the filter driver attempts to synch the times predicted by the disk-drive model and the time actually taken by the HDD to process the request.

If, however, the requesting VM is receiving better performance than the predefined limits imposed by the current throttling scheme (unnecessarily slowing down the file system), the filter driver 230 lifts the delays on the requests. Thus, the filter driver 230 can both speed up or can slow down the flow of requests to mimic the performance characteristics of the HDD. For example, the filter driver 230 is equipped to adapt to a level of performance of the HDD 260, whether the HDD 260 represents physical disk hardware on a personal desktop or whether the HDD 260 represents a commercial-grade disk employed in a data center.

When carrying out its duties as a manager of the flow of requests to the HDD 260, the filter driver 230 may perform various callback routines to implement these duties. One of the callback routines involves a preoperation callback that is invoked by the filter manager 230 for each disk I/O request before the request is processed by the HDD 260. The preoperation callback, initially, determines whether the request should be handled immediately. This decision is based on the difference of the total time consumed by the physical disk hardware and the total projected time to handle the same requests by using the disk-drive model. If the decision indicates the request should be handled immediately, the filter driver 230 passes the request through to the file system and storage driver stack (see reference numerals 240 and 245 of FIG. 2). If the request should be handled in a delayed manner, the filter driver 230 inserts the request into an appropriate queue and schedules a timer routine that triggers processing of the queue at a later time. As mentioned above, there may exist a separate queue for each VHD file being throttled. Also, there may be one or more VHD files associated with a single VM.

Another of the callback routines involves a postoperation callback that is invoked by the filter manager 230 for each disk I/O request after the request is processed. The postoperation callback, in embodiments, records the time consumed by the physical disk hardware to handle the request and updates the total time consumed by the physical disk hardware. Further, the postoperation callback computes the projected execution time to handle the request by accessing the disk-drive model. The projected execution time is used to update the total time spent by the disk-drive model. In addition, the current state of the HDD 260, such as disk-head position, may be stored for future reference in the disk-drive model.

Exemplary Process Flows

Figure 4:
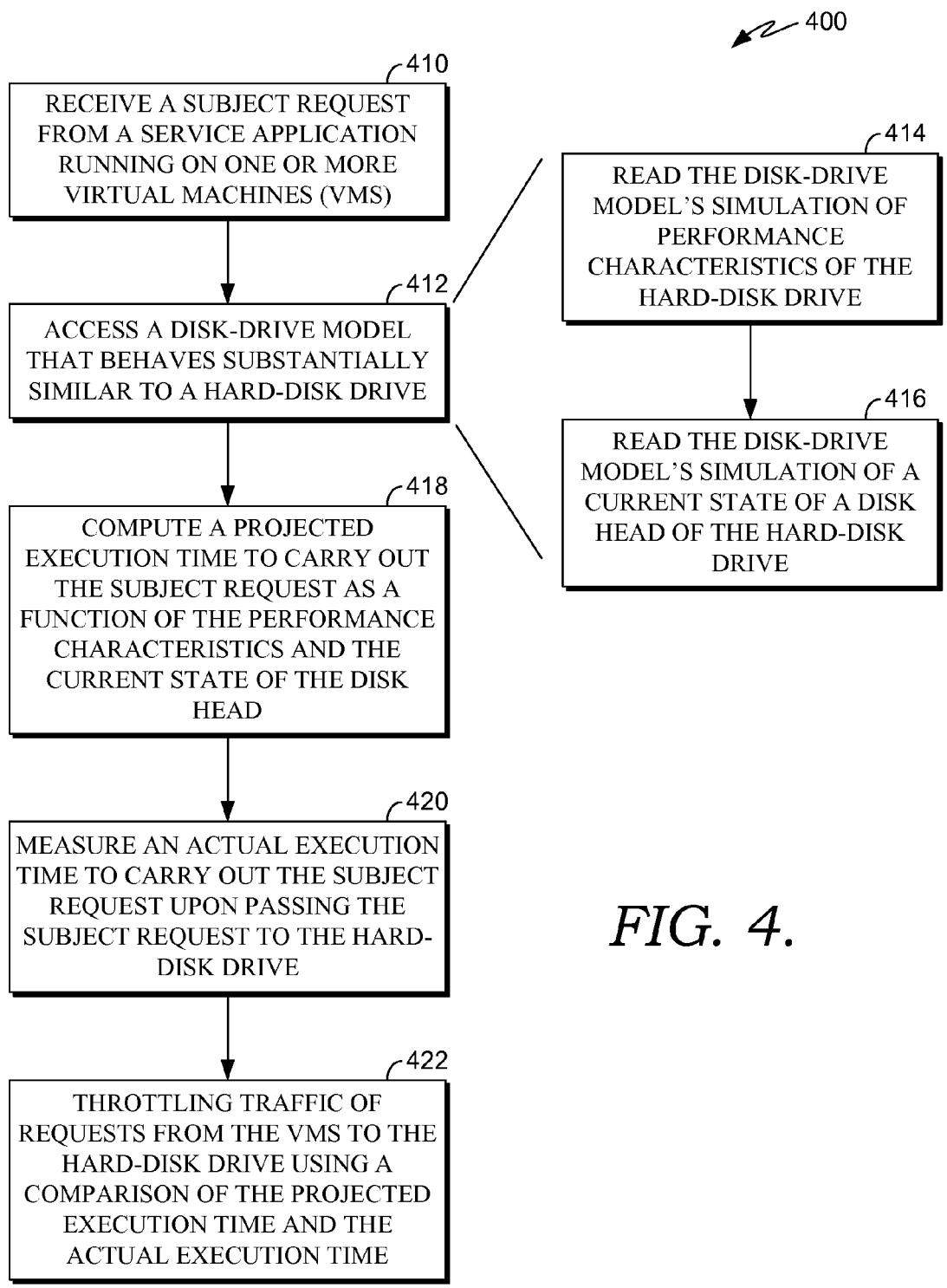
FIG. 4 is a flow diagram showing an exemplary method for throttling requests from one or more virtual machines (VMs) to a hard-disk drive (HDD) using the filter driver, in accordance with an embodiment of the present invention.

Turning now to FIG. 4, a flow diagram is illustrated that shows an exemplary method 400 for throttling requests from one or more VMs to the HDD using the filter driver, in accordance with an embodiment of the present invention. Although the terms "step" and/or "block" may be used herein to connote different elements of methods employed, the terms should not be interpreted as implying any particular order among or between various steps herein disclosed unless and except when the order of individual steps is explicitly described. Initially, the method 400 may commence upon the filter driver receiving a subject request from a service application running on the VMs, as indicated at block 410. By way of example, the subject request may represent a read operation or a write operation directed to a VHD file that maintains stored data on a hard disk of the HDD, wherein the VHD file is associated with at least one of the VMs. Typically, a disk head of the HDD is configured to read or write to the hard disk in response to the read operation or the write operation, respectively.

Upon parsing the request at the filter driver, the disk-drive model is accessed, as indicated at block 412. In an exemplary embodiment, the disk-drive model behaves substantially similar to the HDD and embodies a soft-disk representation of the HDD. In a particular instance, the process of accessing includes reading the disk-drive model's simulation of performance characteristics of the hard-disk drive (see block 414) and reading the disk-drive model's simulation of a current state of a disk head of the hard-disk drive (see block 416). As mentioned above, the simulated performance characteristics are specified by a set of estimated parameters that correspond to a set of actual parameters existing on the hard-disk drive. The set of estimated parameters includes at least the following: a latency of a controller; a speed at which the disk head seeks; a latency of rotation; and a rate of data transfer. The controller latency includes the latency that the disk controller imposes in interpreting and executing a request command. The seek speed includes a rate at which the disk head travels across tracks on a hard disk. The rotational latency includes a time to rotate a hard disk to a location of data targeted by the subject request. And, the data transfer rate includes a speed at which the disk head reads data targeted by the subject request from a hard disk.

The method 400 carried out by the filter driver may further include the step of computing a projected execution time to carry out the subject request as a function of the performance characteristics and the current state of the disk head, as indicated at block 418. In an exemplary embodiment, computing a projected execution time to carry out the subject request involves at least the following steps: identifying a first position of the disk head when carrying out a precedent request; extrapolating from the disk-drive model a second position of the disk head when carrying out the subject request; and calculating a distance of travel between the first position and the second position.

Also, the actual execution time to carry out the subject request may be measured upon the filter driver allowing the subject request to pass to the HDD, as indicated at block 420. Using a comparison of the projected execution time and the actual execution time, the traffic of the requests from the VMs, which are issued after the subject request to the HDD, are throttled, as indicated at block 422. In operation, throttling traffic of the requests from the VMs to the HDD using a comparison of the projected execution time and the actual execution time involves determining an amount of time the projected execution exceeds the actual execution time. In one instance, the exceeding amount of time is compared against a performance threshold assigned to the VM issuing the request to determine whether to delay and/or enqueue the request. Once the subject request is released from the queue, it is conveyed to the HDD for fulfillment of the subject request.

Figure 5:
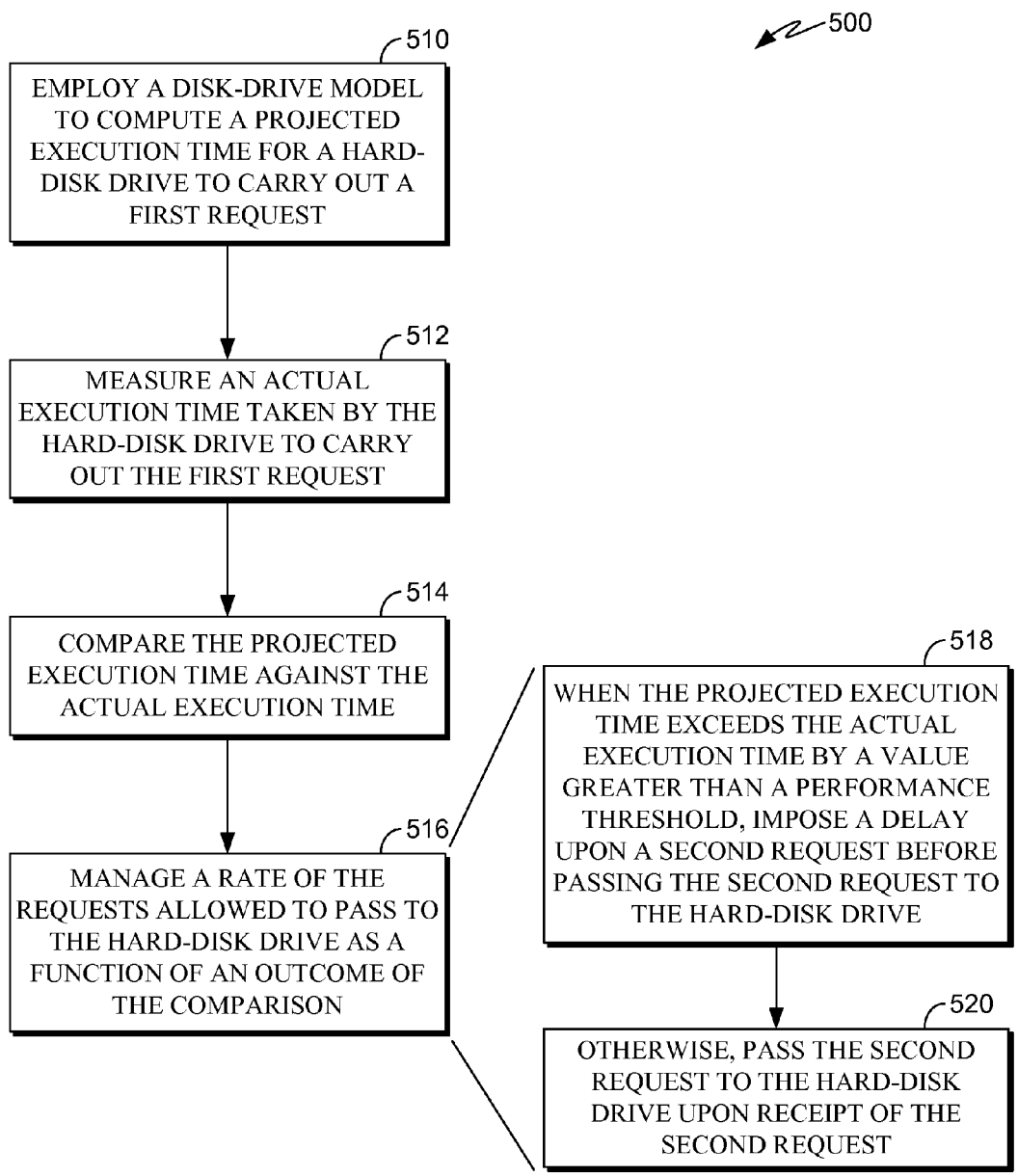
FIG. 5 is a flow diagram showing an exemplary method for limiting a rate of requests flowing to the HDD, in accordance with an embodiment of the present invention.

Turning to FIG. 5, a flow diagram is illustrated showing an exemplary method 500 for limiting a rate of requests flowing to the HDD, in accordance with an embodiment of the present invention. In embodiments, as indicated at block 510, the method 500 involves employing a disk-drive model to compute the projected execution time for the HDD to carry out a first request. The method 500 may then involve measuring the actual execution time taken by the HDD to carry out the first request, as indicated at block 512. When calculating the projected execution time, the disk-drive model considers a time for a disk head (used to read data from or write data to a hard disk of the HDD) to travel from a first sector of data targeted by the first request and a second sector of data targeted by a second request.

As indicated at blocks 514 and 516, the projected execution time is compared against the actual execution time and the rate of the requests allowed to pass to the HDD is managed as a function of an outcome of the comparison. In one instance, as indicated at block 518, the process of managing includes imposing a delay upon the second request before passing the second request to the HDD when the projected execution time exceeds the actual execution time by a value greater than a performance threshold. In another instance, as indicated at block 520, the process of managing includes passing the second request to the HDD upon receipt of the second request when projected execution time does not exceed the actual execution time by a value greater than the performance threshold.

Embodiments of the present invention have been described in relation to particular embodiments, which are intended in all respects to be illustrative rather than restrictive. Alternative embodiments will become apparent to those of ordinary skill in the art to which embodiments of the present invention pertain without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. A method for throttling requests from one or more virtual machines (VMs) to a hard-disk drive using a filter driver, the method comprising:

receiving a subject request from a service application running on one of the one or more VMs;

accessing a disk-drive model that behaves similarly to the hard-disk drive, the process of accessing comprising:

(a) reading the disk-drive model's simulation of performance characteristics of the hard-disk drive, wherein the simulated performance characteristics are specified by a set of estimated parameters that correspond to a set of actual parameters currently existing on the hard-disk drive, the set of estimated parameters comprising a rate of data transfer; and (b) reading the disk-drive model's simulation of a current state of a disk head of the hard-disk drive;

computing a projected execution time to carry out the subject request as a function of the performance characteristics and the current state of the disk head;

measuring an actual execution time to carry out the subject request upon passing the subject request to the hard-disk drive; and throttling traffic of the requests from the one of the one or more VMs to the hard-disk drive using a comparison of the projected execution time and the actual execution time, the throttling comprising:
   (a) determining an amount of time the projected execution time exceeds the actual execution time; and
   (b) comparing the exceeding amount of time against a performance threshold of the one of the one or more VMs to determine whether to delay the subject request, the performance threshold being based on a performance level for a tenant of the one or more VMs; and
   (c) imposing a delay on the requests from the one of the one or more VMs, an amount of delay of the requests from the one of the one or more VMs being based on, in part, the comparing.

2. The method of claim 1, wherein the method further comprises sending the subject request to the hard-disk drive for fulfillment of the subject request.

3. The method of claim 1, wherein the subject request represents a read operation or a write operation directed to a virtual hard disk (VHD) file that maintains stored data on a hard disk of the hard-disk drive, and wherein the disk head is configured to read or write to the hard disk in response to the read operation or the write operation, respectively.

4. The method of claim 3, the method further comprising building the disk-drive model, wherein the disk-drive model embodies a soft-disk representation of the hard-disk drive, which supports VHD files associated with the one or more VMs.

5. The method of claim 1, wherein computing the projected execution time to carry out the subject request comprises:
   identifying a first position of the disk head when carrying out a precedent request;
   extrapolating from the disk-drive model a second position of the disk head when carrying out the subject request; and
   calculating a time for the disk head to travel between the first position and the second position.

6. The method of claim 1, wherein the set of estimated parameters comprises a latency of a controller, and wherein the controller latency includes a time consumed by the controller to interpret and execute the subject request.

7. The method of claim 1, wherein the set of estimated parameters comprises a speed at which the disk head seeks, and wherein the seek speed includes a rate at which the disk head travels across tracks on a hard disk.

8. The method of claim 1, wherein the set of estimated parameters comprises a latency of rotation, and wherein the rotational latency includes a time to rotate a hard disk to a location of data targeted by the subject request.

9. The method of claim 1, wherein the data transfer rate includes a speed at which the disk head reads or writes data targeted by the subject request to or from a hard disk.

10. The method of claim 1, the imposing a delay comprising delaying in one or more queues the requests from the one of the one or more VMs to the hard-disk drive in proportion to a value of the performance threshold.

11. The method of claim 1, wherein throttling traffic of the requests from the one of the one or more VMs to the hard-disk drive further comprises:

(c) when the exceeding amount of time is less than the performance threshold, lifting the delay on the subject request.

12. A computer system capable of throttling a rate at which requests from a service application are executed by a hard-disk drive utilizing a disk-drive model, the computer system comprising at least one physical machine configured with a computer-storage medium having a plurality of computer software components running thereon, the plurality of computer software components comprising:
   a virtual machine (VM) for hosting a portion of the service application, the service application issuing a second request to read data from or write data to a virtual hard disk file associated with the VM; and
   a filter driver for comparing a projected execution time of a first request, which is calculated using the disk-drive model that simulates performance characteristics of the hard-disk drive, against an actual execution time of the first request, which is measured upon carrying out the first request at the hard-disk drive, and for affecting a time for carrying out the second request based on an outcome of the comparison and a performance threshold of the VM, the disk-drive model considering a set of estimated parameters, which correspond to a set of actual parameters currently existing on the hard-disk drive, the set of estimated parameters comprising a rate of data transfer, the performance threshold being based on a performance level for a tenant of the VM, the affecting a time for carrying out the second request comprising imposing a delay on the second request, an amount of delay of the second request being based on the comparing.

13. The computer system of claim 12, further comprising a VM bus to deliver the second request from the service application to the filter driver.

14. The computer system of claim 12, further comprising one or more queues for holding requests issued from the VM and delayed by the filter driver, wherein the one or more queues feed into the hard-disk drive.

15. The computer system of claim 12, wherein the first request represents a read or write operation that targets data on a first sector of a hard disk of the hard-disk drive, wherein the second request represents a read or write operation that targets data on a second sector of the hard disk, and wherein a disk head of the hard-disk drive is configured to read or write to the hard disk in response to the read or write operation.

16. The computer system of claim 15, wherein the disk-drive model further considers a time for the disk head to travel from the first sector to the second sector of the hard disk.

17. The computer system of claim 14, wherein the filter driver schedules a timer routine that triggers processing of the one or more queues at a later time.

18. The computer system of claim 14, wherein each of the one or more queues corresponds to a different virtual hard disk file being throttled.

19. A computerized method for limiting a rate of requests flowing to a hard-disk drive, the method comprising:
   employing a disk-drive model to compute a projected execution time for the hard-disk drive to carry out a first request from a virtual machine (VM);
   measuring an actual execution time taken by the hard-disk drive to carry out the first request;
   comparing the projected execution time against the actual execution time; and
   managing a rate of requests allowed to pass to the hard-disk drive as a function of an outcome of the comparison, the process of managing comprising:

(a) when the projected execution time exceeds the actual execution time by a value greater than a performance threshold for the VM, imposing a delay upon a second request from the VM before passing the second request to the hard-disk drive, the delay being imposed until a difference between the actual execution time and the projected execution time satisfies the performance threshold for the VM, the performance threshold being based on a performance level for a tenant of the VM, an amount of delay of the second request from the VM being based on the difference between the actual execution time and the projected execution time; and (b) otherwise, passing the second request from the VM to the hard-disk drive upon receipt of the second request.

20. The computerized method of claim 19, wherein the hard-disk drive includes a disk head for reading data from or writing data to a hard disk, and wherein the disk-drive model considers a time for the disk head to travel from a first sector of data targeted by the first request and a second sector of data targeted by the second request.

\* \* \* \* \*